(12) United States Patent
Protter et al.

(10) Patent No.: US 11,125,581 B2
(45) Date of Patent: *Sep. 21, 2021

(54) METHOD AND SYSTEM FOR CALIBRATING COMPONENTS OF AN INERTIAL MEASUREMENT UNIT (IMU) USING SCENE-CAPTURED DATA

(71) Applicant: Alibaba Technology (Israel) Ltd., Herzliya (IL)

(72) Inventors: Matan Protter, Kiryat Ono (IL); Motti Kushnir, Kiryat Ono (IL)

(73) Assignee: ALIBABA TECHNOLOGIES (ISRAEL) LTD., Herzliya (IL)

( * ) Notice: Subject to any disclaimer, the term of this patent is extended or adjusted under 35 U.S.C. 154(b) by 599 days.

This patent is subject to a terminal disclaimer.

(21) Appl. No.: 15/995,356

(22) Filed: Jun. 1, 2018

(65) Prior Publication Data

US 2018/0283898 A1 Oct. 4, 2018

Related U.S. Application Data

(63) Continuation of application No. 15/224,707, filed on Aug. 1, 2016, now Pat. No. 10,012,517.

(51) Int. Cl.
*G01C 25/00* (2006.01)
*G01C 21/00* (2006.01)
(Continued)

(52) U.S. Cl.
CPC ......... *G01C 25/005* (2013.01); *G01C 21/005* (2013.01); *G01C 21/265* (2013.01)

(58) Field of Classification Search
CPC .. G01C 25/005; G01C 21/005; G01C 21/165; G01C 11/02; G01C 21/20; G01C 25/00;
(Continued)

(56) References Cited

U.S. PATENT DOCUMENTS 8,744,763 B2 * 6/2014 Hawkinson .......... G01C 21/165
701/468
8,811,718 B2 * 8/2014 Anai ..................... G01C 11/06
382/154
(Continued)

FOREIGN PATENT DOCUMENTS

CN 103282793 A 9/2013
CN 103344257 A 10/2013
(Continued)

*Primary Examiner* — Luis A Martinez Borrero
(74) *Attorney, Agent, or Firm* — Pearl Cohen Zedek Latzer Baratz LLP

(57) ABSTRACT

A method and a system for calibrating an inertial measurement unit (IMU) via images of a calibration target are provided herein. The method may include: measuring parameters via an IMU; capturing a plurality of calibration images of a scene that contains at least one calibration target, wherein the calibration images are taken from different locations and/or orientations, wherein each of the calibration images shares a common calibration target with at least one other calibration image; calculating, based on the at least one common calibration target, a position and orientation of the sensing device relative to the calibration target, for each location of the capturing of the calibration images; and calibrating the IMU by comparing relative motion between two of the calibration images based on the calculated relative position and orientation, to measurements of the parameters taken by the IMU in time ranges corresponding to the at least two calibration images.

20 Claims, 6 Drawing Sheets

(51) Int. Cl.
*G01C 21/16* (2006.01)
*G01C 21/26* (2006.01)

(58) Field of Classification Search
CPC ......... G01C 11/06; G01C 21/206; G06T 7/80; G06T 7/70; G06T 2207/30244; G06T 5/002; G06T 7/77
See application file for complete search history.

(56) References Cited

U.S. PATENT DOCUMENTS

| | | | |
|---|---|---|---|
| 9,135,705 B2* | 9/2015 | Chao | G01C 17/38 |
| 9,361,688 B2* | 6/2016 | Chao | G01C 21/005 |
| 9,400,930 B2* | 7/2016 | Moeglein | H04W 4/33 |
| 9,405,972 B2* | 8/2016 | Moeglein | G01S 5/163 |
| 9,528,834 B2* | 12/2016 | Breed | G06T 7/73 |
| 9,805,512 B1* | 10/2017 | Katz | G06T 19/006 |
| 9,947,100 B2* | 4/2018 | Moeglein | H04W 4/029 |
| 10,012,517 B2* | 7/2018 | Protter | G01C 21/005 |
| 10,127,732 B1* | 11/2018 | Katz | G06T 7/571 |
| 10,499,038 B2* | 12/2019 | Protter | H04N 17/002 |
| 10,534,443 B2* | 1/2020 | Protter | G06K 9/6256 |
| 10,948,299 B1* | 3/2021 | Zhang | G06T 7/248 |
| 2010/0018285 A1* | 1/2010 | Murphy | G01C 21/20 73/1.79 |
| 2011/0010026 A1* | 1/2011 | Jensen | G01C 21/165 701/3 |
| 2011/0096957 A1* | 4/2011 | Anai | G01C 11/06 382/106 |
| 2013/0131981 A1* | 5/2013 | Hawkinson | G01C 21/165 701/468 |
| 2014/0104437 A1* | 4/2014 | Chao | H04N 17/002 348/187 |
| 2015/0094089 A1* | 4/2015 | Moeglein | G01S 5/16 455/456.1 |
| 2015/0094952 A1* | 4/2015 | Moeglein | H04W 4/33 701/491 |
| 2015/0127239 A1* | 5/2015 | Breed | B60W 30/00 701/70 |
| 2015/0178924 A1* | 6/2015 | Chao | G06T 7/80 348/187 |
| 2015/0192439 A1 | 7/2015 | Mihelich et al. | |
| 2015/0362579 A1 | 12/2015 | Hesch | |
| 2016/0005164 A1 | 1/2016 | Roumeliotis et al. | |
| 2016/0170502 A1 | 6/2016 | Dorsch et al. | |
| 2018/0025632 A1* | 1/2018 | Breed | G01C 21/32 701/93 |
| 2018/0031389 A1* | 2/2018 | Protter | G01C 21/005 |
| 2018/0283898 A1* | 10/2018 | Protter | G01C 21/005 |

FOREIGN PATENT DOCUMENTS

| | | |
|---|---|---|
| CN | 103438904 A | 12/2013 |
| CN | 103954283 A | 7/2014 |
| CN | 105675013 A | 6/2016 |
| EP | 2 600 109 A2 | 6/2013 |

* cited by examiner

METHOD AND SYSTEM FOR CALIBRATING COMPONENTS OF AN INERTIAL MEASUREMENT UNIT (IMU) USING SCENE-CAPTURED DATA

CROSS-REFERENCE TO RELATED APPLICATIONS

This application is a continuation of the U.S. patent application Ser. No. 15/224,707, filed Aug. 1, 2016, which is hereby incorporated by reference in its entirety.

FIELD OF THE INVENTION

The present invention relates generally to the field of calibrating an inertial measurement unit (IMU), and more particularly calibrating same using scene-captured data.

BACKGROUND OF THE INVENTION

Prior to the background of the invention being set forth, it may be helpful to set forth definitions of certain terms that will be used hereinafter.

The term "Inertial Measurement Unit" or "IMU" as used herein is a hardware device that allows measuring various physical quantities and inferring the motion of the device from them. It is used in various scenarios: Vehicle and personal navigation; Smartphones, for things like gaming (measuring the tilt or motion of the device), step counter, navigation, safety (i.e., turning the device off when it senses it is in free-fall); heads-up display (HUD) such as smart glasses, to compensate for user's motion and projecting correct point of view; and Various controllers, to determine the user's motions and translate them into motion (e.g., Wii™ remote, Xbox™ controller). There are at least three main components in IMU, where at least one of them must be present for information to be available:

The term "Accelerometer" as used herein is a device that measures the total forces applied on the device (including gravity), and infers the total acceleration. Because it measures gravity, when the device is stationary the output of the device is g (the force of gravity). When the device is in acceleration, the device's output is the vector of the total acceleration (gravity plus body acceleration).

The accelerometer can be in 1-axes, 2-axes or 3-axes configuration. Practically, the device measures the projection of the total acceleration vector (since it has direction and size) on the number of axes the device has. Most common are 2-axes and 3-axes.

The accelerometer can be used to measure the pitch and roll of the device (i.e., angles relative to the horizon). When the device is stationary, the projection of the gravity onto its axes is completely determined by its pitch and roll, and therefore by measuring these projections it is possible to reverse compute the pitch and roll.

The accelerometer can also be used to measure the displacement of the device. By removing the known size and orientation of the gravity (assuming we know the pitch and roll accurately even while in motion—the gyro or external sources can be used for that), we are left with the actual body accelerations. By integrating the acceleration, we get the object speed, and from integrating the speed, we get the object displacement.

In practice, due to limited sampling rate, the noise in the measurements, and not knowing the gravity with high accuracy, the displacement is only approximate, and the quality of estimation deteriorates with time.

The term "Gyroscope" or "Gyro" as used herein is a device that measures the rate of rotation of the device around each of the axes it has (1, 2, or 3). This allows estimating the device's current angles, if the angles were known at a previous point in time, and integrating the rate (speed) of rotation over time.

There are differences between the gyro and accelerometer when it comes to measuring angles: Accelerometer can measure only pitch and roll, gyro measures all three; Accelerometer measures absolute angles, while gyro measures only change. This means, the accuracy of the accelerometer is not time-dependent (it only depends on if the device is stationary and the accuracy of the measurement), while if relying only on the gyro the accuracy deteriorates over time.

Gyro measures changes in angles directly, accelerometer measures through measuring an outside known fixed quantity (gravity).

The term "Magnetometer" as used herein is a device that measures the total magnetic field in the environment. Like the accelerometer, it measures the projection of the magnetic field onto its axes (1, 2, or 3 axes). Like the accelerometer uses gravity to measure pitch and roll, the magnetometer uses the magnetic field to measure azimuth, as it is assumed the magnetic field is usually orthogonal to the gravity. Note, that azimuth is relative to the local magnetic field, and not necessarily close to the "actual" azimuth (which points towards the earth's magnetic field, or the one that points towards the North Pole). Using the magnetometer allows measuring rotations around two axes that are normal to the direction of the magnetic field. Azimuth can be recovered if the magnetic field's orientation relative to the gravity is known (in which case the component that is normal to gravity is computed).

Computing the azimuth from the magnetometer readings is similar to computing pitch and roll from accelerometer.

One problem with using the magnetometer to measure azimuth is that is assumes the magnetic field is constant. Usually, the device is connected to additional electrical devices, which create magnetic fields of their own, which are not constant in time. As a result, the azimuth estimation is prone to errors.

Additional components can be: thermometer, pressure sensor, barometric pressure sensor, and the like.

In order to obtain high accuracy of motion estimation from an IMU, it is important to have two types of accuracies:
  A. Actual measurement accuracies—that the output of the accelerometer, gyroscope and magnetometer are accurate.
  B. Manufacturing accuracies—due to the manufacturing processes, the components are not ideal. Some examples:
  The axes of each component are not exactly orthogonal (90 degrees)
  The axes of the various components are not completely aligned (e.g., the x axis of the accelerometer is not exactly parallel to the x axis of the gyroscope).
  Bias—the "0" of the device is not exactly the "0" of the measure quantity (i.e., if B is the bias, the device will output B when the true measurement in 0, and will output 0 when the true measurement is −B). This is per component, per axes. Bias has a constant component, and a component that can change over time.
  Drift—the rate of change of bias over time. Like Bias, Drift also has a constant component, and a component that can change over time.

Scaling—A constant factor which translates the value measured and the electrical signal strength that represents it.

The measurement accuracies may change over time which means these errors cannot be averaged out. Additionally, the manufacturing inaccuracies are systematic—meaning they quickly accumulate. Without an external source of information, these inaccuracies cannot be estimated.

The term "calibration" as used herein is what the process of estimating the manufacturing inaccuracies is called. The result of the calibration is knowing all those parameters—axes configurations (of each component and between components), bias, drift, and so on. Calibration can also include modelling the measurement inaccuracies (e.g., mean and standard deviation).

For the calibration process to take place, a way to obtain the orientation (and position) of the device is needed, which is independent of the device's own sensors. Furthermore, to obtain high accuracy, this external information is needed for many different combinations of orientations of the device (i.e., just one orientation is not enough).

The difference in prices between various IMUs is sometimes due to the different in the amount of work put into the calibration process.

Sometimes, calibration is performed by attaching the IMU to a rotating table, which is able to measure its own angles very accurately, therefore providing the external information about the angles which is needed for the calibration process. During the calibration process, all manufacturing inaccuracies are determined, as well as the relative orientation between the IMU and the rotating table.

However, the aforementioned calibration device is expensive, not mobile, and not always available. Therefore it would be advantageous to have a calibration method for IMUs using other means.

SUMMARY OF THE INVENTION

In order to overcome the drawbacks of currently available methods for calibrating an IMU, it is suggested herein to calibrate an IMU by rigidly connecting it to a sensing device that has the ability to measure its own angles. Such a sensing device may be a camera, a depth sensor, and the like. This calibration method can be implemented with readily available devices that already have an IMU and a capturing device intergrated together (such as smartphones, car navigation systems and Heads Up Displays (HMDs)).

Some embodiments of the present invention provide a method and a system that enable calibrating an inertial measurement unit (IMU) via images of at least one calibration target. The system may include an inertial measurement unit (IMU) configured to measure inertial parameters; a sensing device coupled to the IMU, wherein the sensing device is configured to capture a plurality of images of a scene, wherein the images are taken from different locations and/or orientation and each image contains at least one common calibration target with another image; and a computer processor configured to: analyze the captured images, and calculate, based on the at least one common calibration target, a positional change and orientational change of said sensing device relative to said calibration target, for each pair of the captured images; and calibrate the IMU based on at least one relative motion between at least one pair of images, and comparing it to measurements of said inertial parameters taken by the IMU in locations during same time span as when the at least one pair of images were taken.

The method in accordance of the present invention may implement the aforementioned system possibly in a different architecture. Steps of the method in accordance with embodiments of the present invention may include: measuring parameters via an IMU; capturing a plurality of calibration images of a scene that contains at least one calibration target, wherein the calibration images are taken from different locations and/or orientations, wherein each of the calibration images shares a common calibration target with at least one other calibration image; calculating, based on the at least one common calibration target, a position and orientation of the sensing device relative to the calibration target, for each location of the capturing of the calibration images; and calibrating the IMU by comparing relative motion between two of the calibration images based on the calculated relative position and orientation, to measurements of the parameters taken by the IMU in time ranges corresponding to the at least two calibration images.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
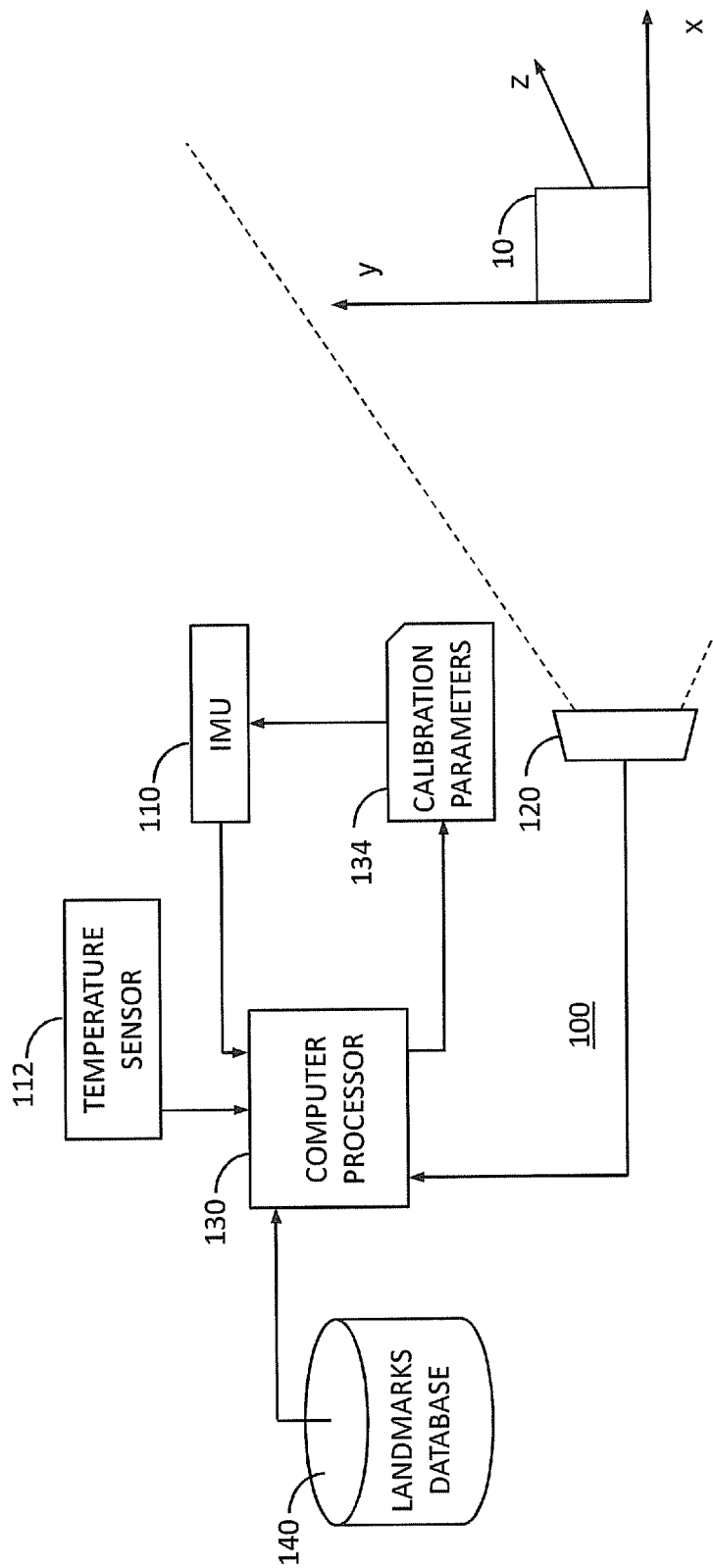
FIG. 1 is a block diagram illustrating non-limiting exemplary architectures of a system in accordance with embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

FIG. 1 is a block diagram illustrating an exemplary architecture on which embodiments of the present invention may be implemented. System 100 may include an inertial measurement unit (IMU) 110 configured to measure parameters (such as orientation, velocity, gravitational force, and magnetization) indicative of inertial data. System 100 may further include a sensing device 120 coupled to the IMU, wherein the sensing device 120 is configured to capture a plurality of images of a scene, wherein the images are taken from different locations and contain at least one common calibration target for each pair of images.

System 100 may include a computer processor 130 configured to: analyze the captured images, and calculate, based on the at least one common calibration target 10, a position and orientation of the sensing device 120 relative to calibration target 10, for each location of the capture images; and calibrate the IMU based on at least one relative motion between at least one pair of images, and comparing it to measurements of the parameters taken by the IMU in locations corresponding to the at least one pair of images.

According to some embodiments, calibration target 10 may include at least three landmarks as long as they are not located on a common line. The preferred embodiment would be a checkerboard pattern of some kind whose corners or at least three points are known.

According to some embodiments, system 100 may further include a database 140 configured to store proximal locations within the scene of said landmarks, and wherein the computer processor is configured to use the proximal locations from the database to determine the relative locations from which the images are captured.

According to some embodiments, the parameters measured by the IMU component may include any of the following: velocity, orientation, gravitational forces, and magnetization.

According to some embodiments, the computer processor is further configured to calculate a relative calibration of the axes of the sensing device and the IMU.

According to some embodiments, the computer processor is further configured to calculate an orientation of the target in space comprising: pitch and roll relative to the horizon.

According to some embodiments, the computer processor is further configured to calibrate the sensing device, based on at least one relative motion between at least one pair of images.

According to some embodiments, the sensing device is a 2D camera. Alternatively it is non-optical image capturing device.

Figure 2A:
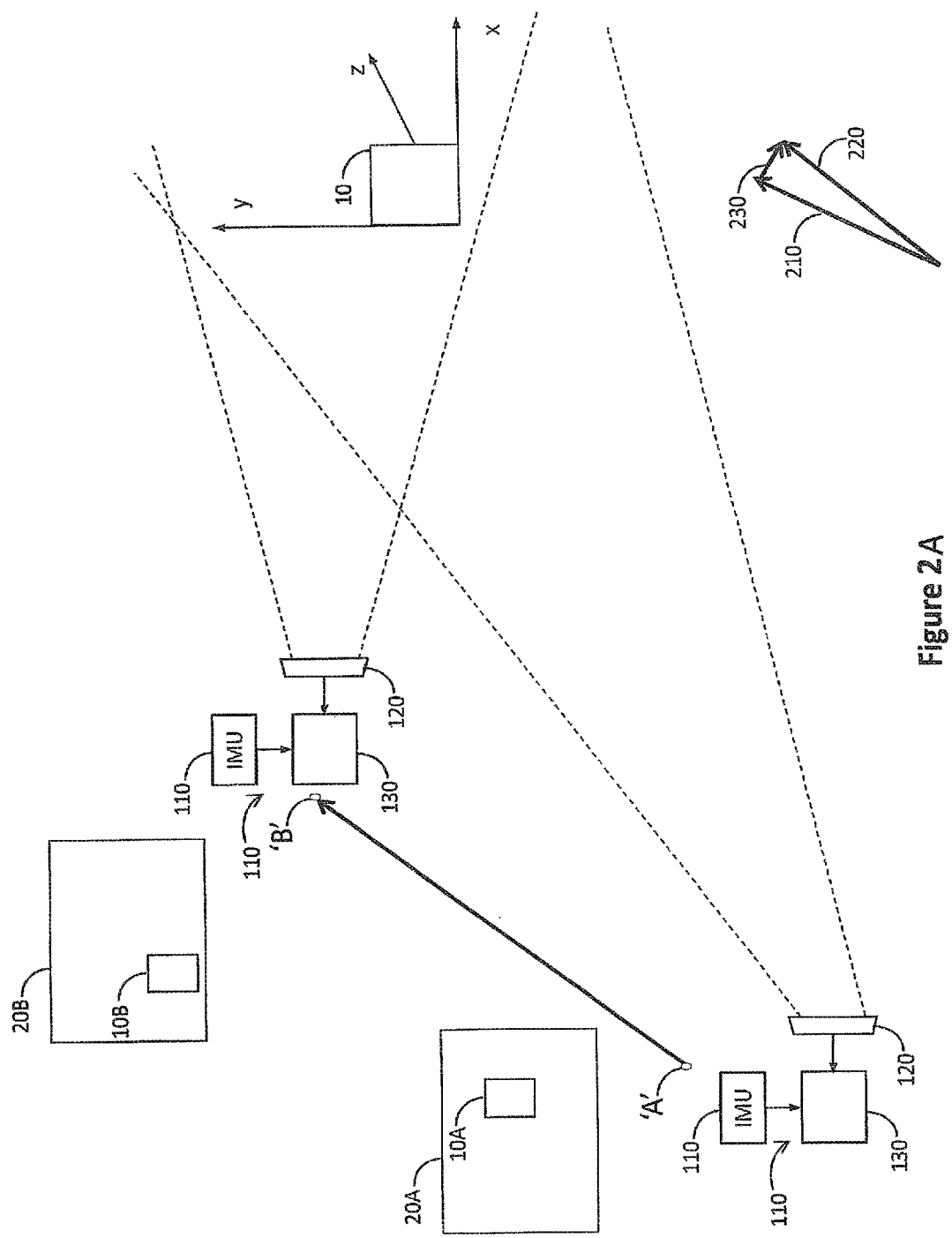
FIG. 2A is a block diagram illustrating non-limiting exemplary use case of a system in accordance with embodiments of the present invention.

FIG. 2A is a block diagram illustrating an exemplary use case illustrating embodiments of the present invention. System 100 having an IMU 110, a capturing device 120, and a computer processor 130 operating together is illustrated moving from point A to point B in a scene. While doing so, capturing device captures images 20A and 20B of the scene and specifically, landmarks 10 which are located in different positions 10A and 10B in images 20A and 20B, respectively. At the same time, IMU 110 is recording the sensor outputs of system 100 later to be analyzed by compute processor 130.

In operation, computer processor 130 is configured to calculate the spatial transformation (i.e., change of location and change of orientation) between point 'A' and point 'B', based on the changes to the landmark locations 10B in image 20B compared with the landmark location 10A in image 20A, yielding a landmark-based transformation vector 210. At the same time, the sensors outputs recorded by IMU 110 at points 'A' and point 'B' are used to compute an IMU-based transformation vector 220. The error vector 230, obtained by subtracting landmark-based transformation vector 210 and the IMU-based transformation vector 220, stems from both calibration errors and random measurement errors. Computer processor 130 is further configured to sequentially modify the calibration parameters 134 as to reduce the magnitude of the error vector 230 until no further reduction is possible. Then it is determined that the system is calibrated using the modified calibration parameters 134.

It is understood that the transformation discussed above can be merely rotation or change of orientation without change in location in space or a combination of rotation and change of location, and may also apply to only some portions of the transformation (i.e., include only the orientation change even when a positional change has occurred as well).

Figure 2B:
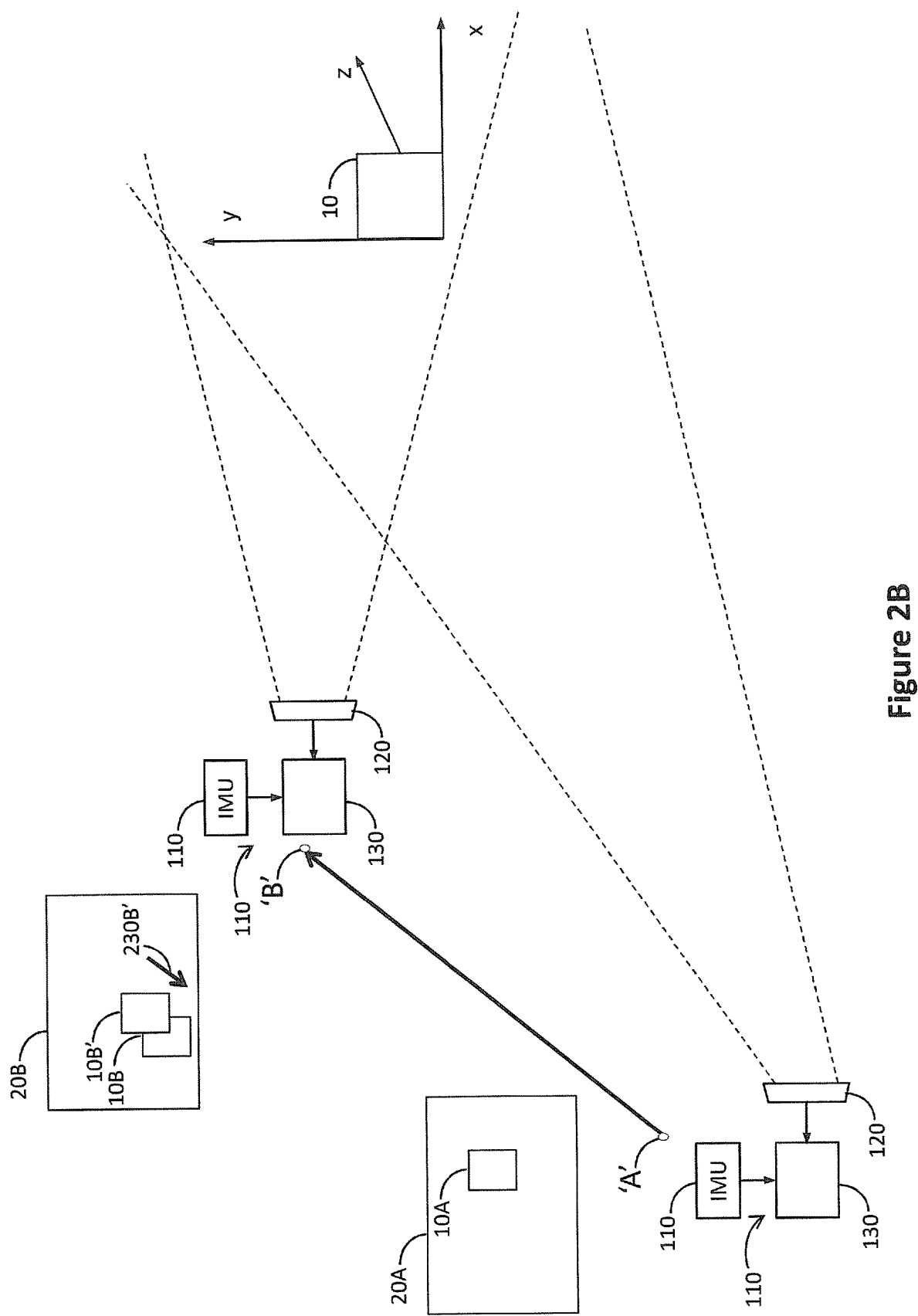
FIG. 2B is a block diagram illustrating another non-limiting exemplary use case of a system in accordance with embodiments of the present invention.

FIG. 2B is a block diagram illustrating an alternative exemplary use case illustrating embodiments of the present invention. In the alternative use case, computer processor 130 may be configured to compute the expected location 10B' of landmarks 10 in image 20B taken from position B based on the calculated location 10A in image 20A taken at position A, the sensor outputs, and the calibration parameters 134. Computer processor 130 is further configured to measure the error 230B' in the estimation of location 10B' relative to the actual detected locations 10B. Computer processor 130 is further configured to sequentially modify the calibration parameters 134 as to reduce the magnitude of the error vector 230B' until no further reduction is possible. Then it is determined that the system is calibrated using the modified calibration parameters 134.

It is further noted that in any case that a calibration target is non-stationary when computing the landmarks-based transformation, the movement of the calibration target should be taken into account in a form of a transformation vector of the landmarks 10 themselves.

According to some embodiments of the present invention the aforementioned calibration process can be carried out in on-going manner as opposed to one-time, so calibration parameters estimation improves as more data is available.

In some cases, it is possible to calibrate some components of an IMU given that other components are already calibrated. For example, a calibrated gyroscope and accelerometer can be used to calibrate the magnetometer without any further external data.

According to some embodiments, it would be advantageous to use the temperature sensor 112 usually included in IMUs. This is due to the fact that the calibration may be temperature dependent. It is therefore suggested to carry out several measurements in different temperature levels so that a calibration over a specified temperature range can be achieved. Then, when actually operating an IMU, the current temperature is measured and the respective calibration parameters associated with the current temperature can be used. One way of benefiting from temperature dependent relationship is to look for a closest calibrated working point and work based on the calibrated working point. Another way is to carry out an interpolation of at least some of the temperature calibrated points and basing the calibration on the interpolated curve. The temperature calibration process serves as an enabler to working with an IMU in temperature-varying environments.

The aforementioned logic of embodiments of the present invention may be implemented by the following steps: measuring parameters via an inertial measurement unit (IMU); capturing a plurality of calibration images of a scene that contains at least one calibration target, wherein the calibration images are taken from different locations and/or orientations, wherein each of the calibration images shares at least one common calibration target with at least one other calibration image; detecting the captured position and/or orientation of at least one element from the calibration target on the sensor of the sensing device, for at least one of the calibration images; estimating, based on the detected location and/or orientation of the at least one element of the calibration target in one calibration image, a position and/or orientation of the element in another calibration image, based on the calibration parameters; and calibrating at least one parameter of one component of the IMU by comparing the calculated position and/or orientation of the calibration target in one image with the estimated position and/or orientation of the calibration target in said image as estimated from a different calibration image.

Figure 3:
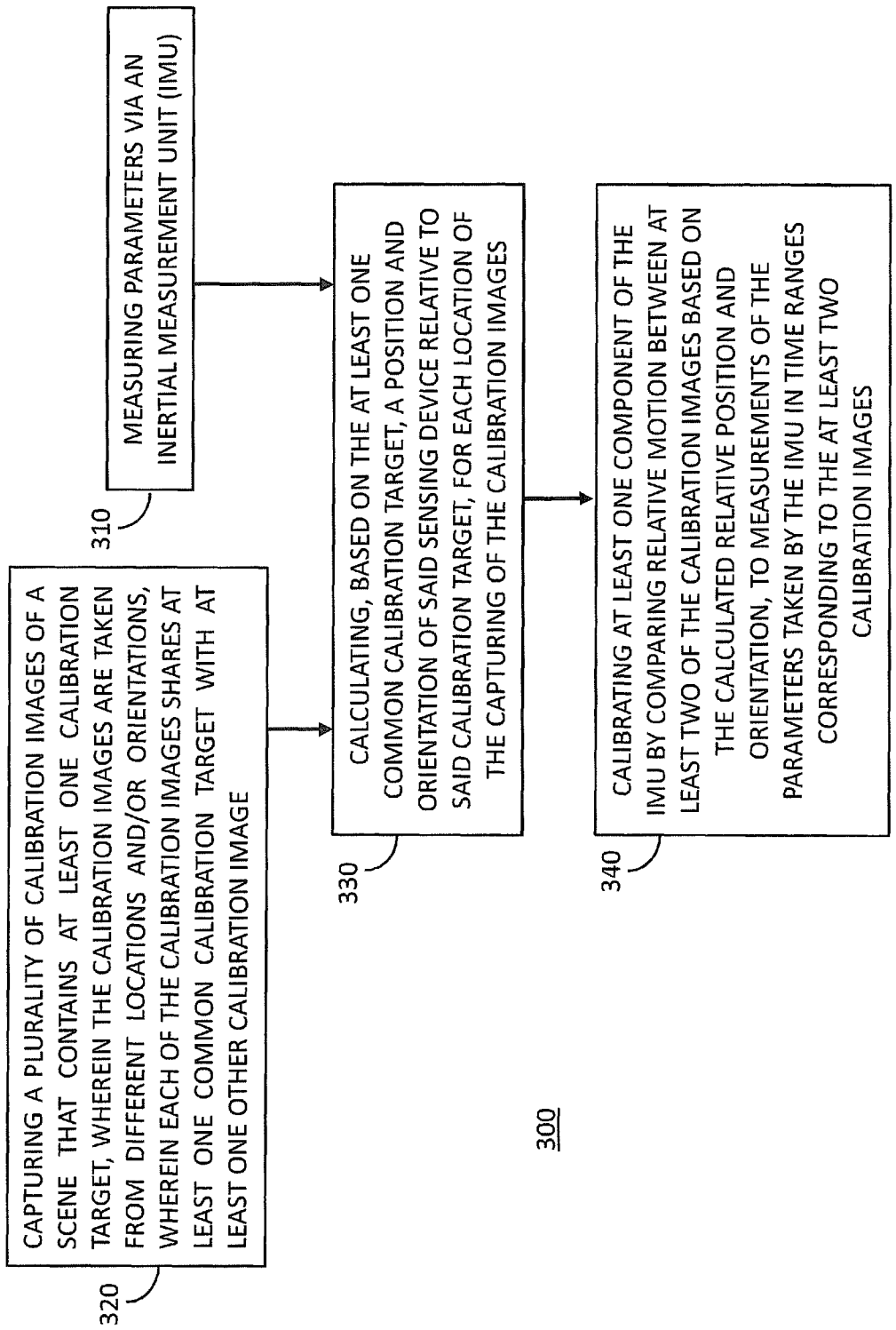
FIG. 3 is a high level flowchart illustrating non-limiting exemplary method in accordance with embodiments of the present invention.

FIG. 3 is a flowchart diagram illustrating an exemplary process on which embodiments of the present invention may be implemented. Method 300 may include the following steps: measuring parameters via an inertial measurement unit (IMU) 310; capturing a plurality of calibration images of a scene that contains at least one calibration target, wherein the calibration images are taken from different locations and/or orientations, wherein each of the calibration images shares at least one common calibration target with at least one other calibration image 320; calculating, based on the at least one common calibration target, a position and orientation of said sensing device relative to said calibration target, for each location of the capturing of the calibration images 330; and calibrating at least one component of the IMU by comparing relative motion between at least two of the calibration images based on the calculated relative position and orientation, to measurements of said parameters taken by the IMU in time ranges corresponding to the at least two calibration images 340.

According to some embodiments, method 300 may further include the step of storing proximal locations within the scene of said landmarks, and using the proximal locations from the database to determine the relative locations from which the images are captured.

According to some embodiments, method 300 may further include the step of calculating a relative calibration of the axes of the sensing device and the IMU.

According to some embodiments, method 300 may further include the step of calculating an orientation of the at least one calibration target in space comprising: pitch and roll relative to the horizon.

According to some embodiments, method 300 may further include the step of calibrating the sensing device, based on at least one relative motion between at least one pair of images.

Figure 4A:
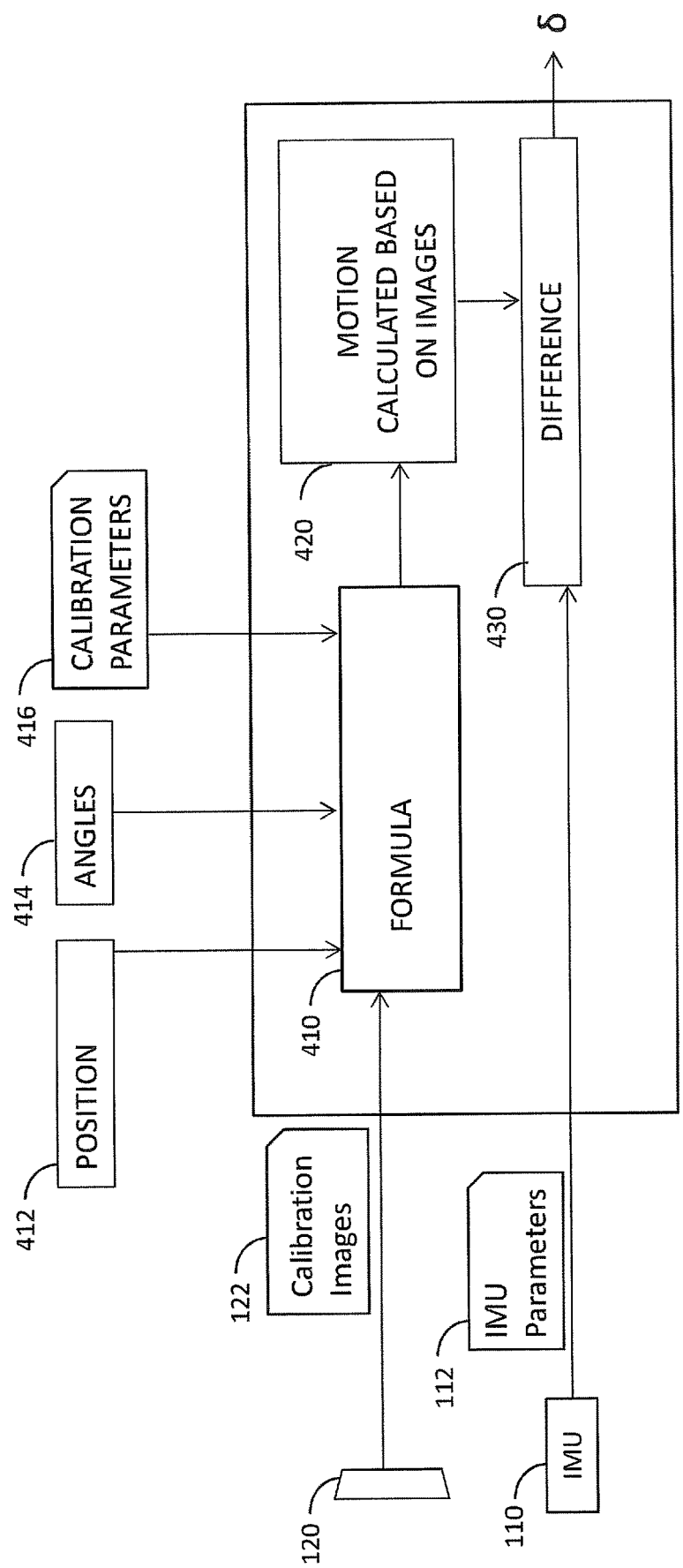
FIG. 4A is a block diagram illustrating another aspect in accordance with embodiments of the present invention.

FIG. 4A is a block diagram illustrating yet another aspect in accordance with embodiments of the present invention as detailed in FIG. 2A above. An exemplary implementation of the algorithm in accordance with embodiments of the present invention is described herein. Sensing device 120 provides calibration images 122 being input to a formula 410 that is tailored for the specific sensing device. The formula then estimates the motion of the sensing device between two calibration images 420 which is then compared by a comparator 430 with the IMU parameters 112 measured directly by IMU 110. Then, in order to minimize the delta δ being the product of comparator 430, position 412, angles 414 and calibration parameters 416 are being adjusted in various manners known in the art so as the delta is minimal. Once delta δ is minimized, the IMU, or at least a component of the IMU whose parameters were measured, is now calibrated and the adjusted calibration parameters may be stored.

Figure 4B:
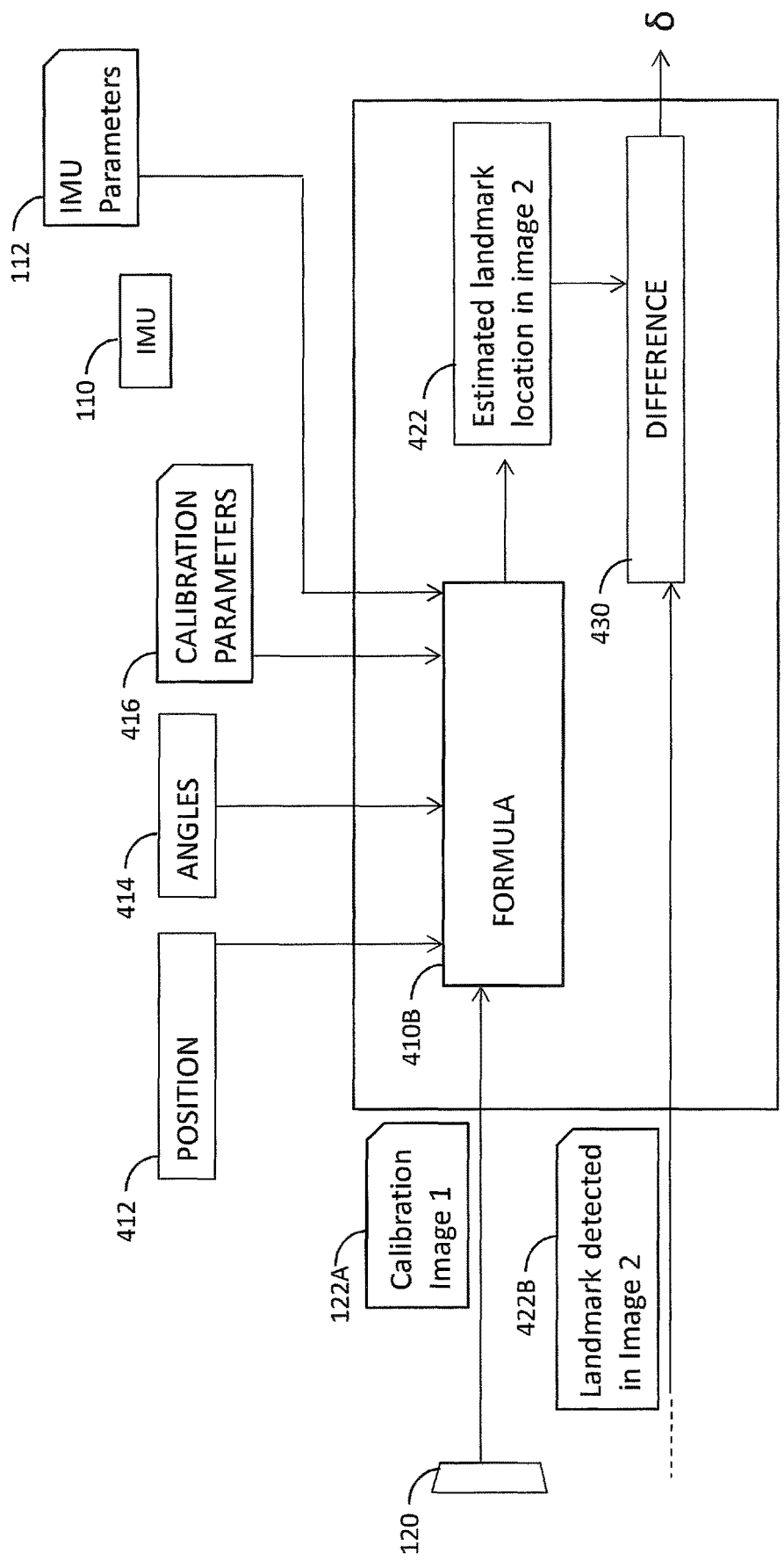
FIG. 4B is a block diagram illustrating yet another aspect in accordance with embodiments of the present invention.

FIG. 4B is a block diagram illustrating yet another aspect in accordance with embodiments of the present invention as detailed in FIG. 2B above. An exemplary implementation of the algorithm in accordance with embodiments of the present invention is described herein. Sensing device 120 provides a calibration image 1 122A taken from position A being input to a formula 410B that is tailored for the specific sensing device and is further fed by the IMU parameters 112. Formula 410B estimates the landmark location in image 2 taken from position B 422 which is then compared by a comparator (difference) 430 with the location of the landmark as directly detected in image 2 422B. Then, in order to minimize the delta δ being the product of comparator 430, position 412, angles 414 and calibration parameters 416 are being adjusted in various manners known in the art so as the delta is minimal. Once delta δ is minimized, the IMU, or at least a component of the IMU whose parameters were measured, is now calibrated and the adjusted calibration parameters may be stored.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention.

The invention claimed is:

1. A system comprising:
   an inertial measurement unit (IMU) configured to measure IMU parameters;
   a sensing device coupled to said IMU, wherein the sensing device is configured to capture a plurality of calibration images of a scene that contains at least one calibration target, wherein the calibration images are taken from different positions and/or orientations, wherein each of the calibration images shares at least one common calibration target with at least one other calibration image; and
   a computer processor configured to:
      detect a position and/or orientation of at least one element of the calibration target captured by the sensing device, for at least a first one of the calibration images;
      estimate, based on the IMU parameters and the detected position and/or orientation of the at least one element of the calibration target in a second calibration image, a position and/or orientation of the element in the first calibration image; and
      calibrate at least one IMU parameter of one component of the IMU by comparing the detected position and/or orientation of the calibration target in the first image with the estimated position and/or orientation of the calibration target in said first image as estimated from the second calibration image.

2. The system according to claim 1, wherein the calibration target comprises at least three landmarks not located on a common line.

3. The system according to claim 2, further comprising a database configured to store proximal positions of said landmarks within the scene, and wherein the computer processor is configured to use the proximal positions from the database to determine relative positions from which the images are captured.

4. The system according to claim 1, wherein the IMU parameters comprise at least one of: velocity, orientation, rotational velocity, acceleration, gravitation, magnetic field, and total forces.

5. The system according to claim 1, wherein the computer processor is further configured to calculate a relative calibration of axes of the sensing device and the IMU.

6. The system according to claim 1, wherein the sensing device is a 2D camera.

7. The system according to claim 1, wherein the sensing device is a non-optical image capturing device.

8. The system according to claim 1, further comprising a temperature sensor configured to measure a temperature of the IMU, wherein the computer processor is further configured to obtain calibration parameters for a plurality of temperature levels and calibrate the at least one component of the IMU by at least one of: looking for a closest calibrated working point and working based on the calibrated working point; and carrying out an interpolation of at least the calibrated working point and basing the calibration on the interpolated curve.

9. The system according to claim 1, wherein the computer processor is further configured to compute an expected position of landmarks in an image based on the detected position, outputs of the sensing device, and the calibration parameters.

10. The system according to claim 1, wherein the computer processor is further configured to measure an error in the estimation of positions relative to the detected positions.

11. The system according to claim 10, wherein the computer processor is further configured to sequentially modify the calibration parameters as to reduce a magnitude of the error until no further reduction is possible.

12. A method comprising:
   measuring inertial measurement unit (IMU) parameters at an IMU;
   capturing a plurality of calibration images of a scene that contains at least one calibration target at a sensing device, wherein the calibration images are taken from different positions and/or orientations, wherein each of the calibration images shares at least one common calibration target with at least one other calibration image;
   detecting a position and/or orientation of at least one element of the calibration target by the sensing device, for at least a first one of the calibration images;
   estimating, based on the IMU parameters and the detected position and/or orientation of the at least one element of the calibration target in a second calibration image, a position and/or orientation of the element in the first calibration image; and
   calibrating at least one IMU parameter of one component of the IMU by comparing the detected position and/or orientation of the calibration target in the first image with the estimated position and/or orientation of the calibration target in said first image as estimated from the second calibration image.

13. The method according to claim 12, wherein the calibration target comprises at least three landmarks not located on a common line.

14. The method according to claim 13, further comprising storing proximal positions of said landmarks within the scene, and using the proximal positions from the database to determine relative positions from which the images are captured.

15. The method according to claim 12, wherein the IMU parameters comprise at least one of: velocity, orientation, and gravitational forces.

16. The method according to claim 12, further comprising calculating a relative calibration of axes of the sensing device and the IMU.

17. The method according to claim 12, further comprising: measuring a temperature of the IMU; obtaining calibration parameters for a plurality of temperature levels; and calibrating the at least one component of the IMU by using the calibration parameters by at least one of: looking for a closest calibrated working point and working based on the calibrated working point; and carrying out an interpolation of at least the calibrated working point and basing the calibration on the interpolated curve.

18. The method according to claim 12, wherein the computer processor is further configured to compute an expected position of landmarks in an image based on the detected position, outputs of the sensing device, and the calibration parameters.

19. The method according to claim 12, wherein the computer processor is further configured to measure an error in the estimation of position relative to the detected position.

20. The method according to claim 19, wherein the computer processor is further configured to sequentially modify the calibration parameters as to reduce a magnitude of the error until no further reduction is possible.

* * * * *